United States Patent Office 3,336,374
Patented Aug. 15, 1967

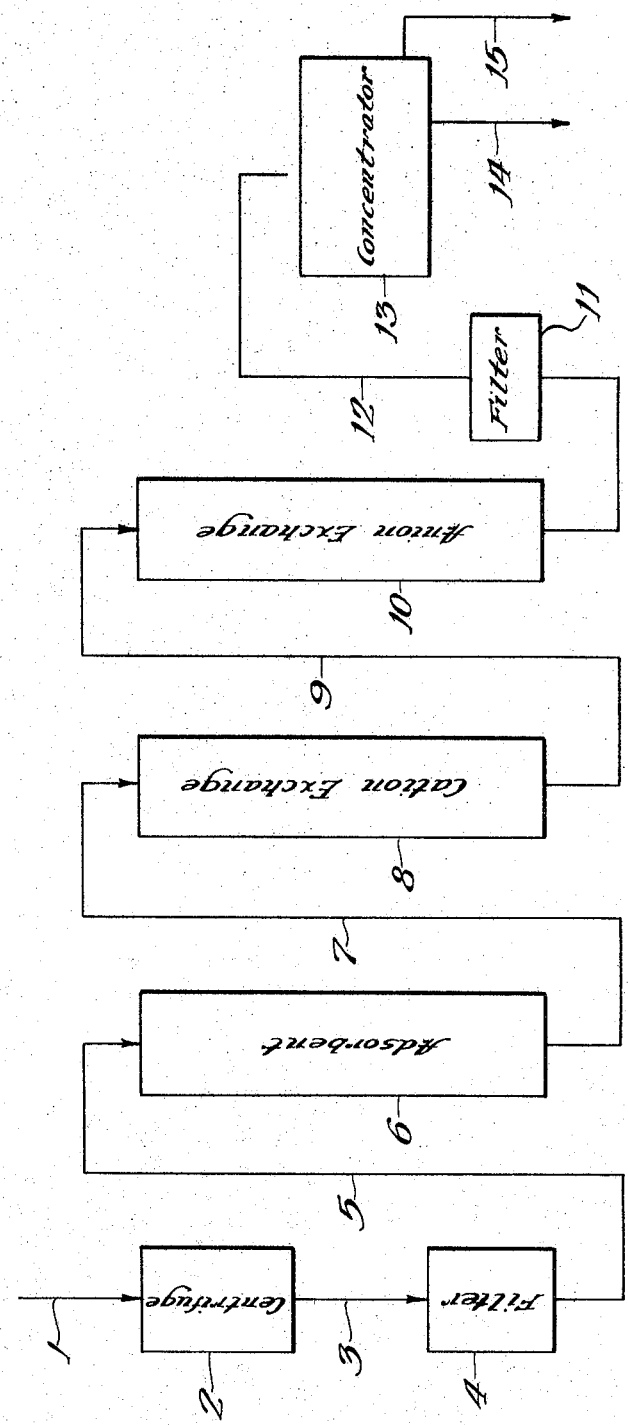

3,336,374
RECOVERY OF L-GLUTAMIC ACID
Reuven Dobry, Bakersfield, Calif., assignor to International Minerals & Chemical Corporation, a corporation of New York
Filed Feb. 15, 1963, Ser. No. 258,696
6 Claims. (Cl. 260—527)

This invention relates to the recovery of L-glutamic acid and more specifically relates to the recovery of L-glutamic acid from fermentation broths.

L-glutamic acid has been produced for a number of years by recovery from Steffen's filtrate, wheat gluten, and the like. In these processes the starting materials are hydrolized either with acid or with caustic to convert glutamic acid precursors to glutamic acid. In a typical process the glutamic acid is then crystallized by adjusting the pH of the solution to above the isoelectric point of glutamic acid (pH 3.2) with a mineral acid such as hydrochloric acid. At the isoelectric point the solubility of glutamic acid is quite low and consequently the glutamic acid precipitates from the solution.

More recently, intense activity has occurred with respect to the production of L-glutamic acid by biological means. Fermentation procedures for the production of broths containing glutamic acid have been reported extensively in the literature. Such references include, inter alia, Canadian Patent 604,712 (*Micrococcus glutamicus*); Canadian Patent 625,387 (*Brevibacterium divaricatum*); Canadian Patent 633,170 (*Microbacterium flavum*); Belgian Patent 609,701 (*Corynebacterium lilium*); U.S. Patent 3,032,474 (*Bacillus megaterium-cereus*), and the like.

The recovery of glutamic acid from fermentation broths may be accomplished generally following the earlier procedures. Thus, for example, the fermentation broth may initially be centrifuged to remove cells, filtered to remove colloidal materials, concentrated if necessary, and adjusted to the isoelectric point so that glutamic acid will crystallize from the solution.

In an effort to optimize the efficiency and consequently the economics of fermentation processes, the art has also investigated the use of ion exchange resins for the recovery of glutamic acid. It has been suggested, for example, that the glutamic acid be adsorbed on an ion exchange resin and subsequently eluted from the resin with hydrochloric acid, sodium hydroxide, ammonium hydroxide and the like. The eluate is then treated to provide glutamic acid. Such processes are described, inter alia, in U.S. Patents 2,773,001; 2,877,160; 2,947,666 and 2,978,384.

It has also been suggested that glutamic acid-containing solutions first be contacted by a cation exchange resin to remove cations, subsequently be contacted by an anion exchange resin to remove inorganic ions, and finally be contacted by an additional anion exchange resin to adsorb glutamic acid. The adsorbed glutamic acid may be eluted from the final anion exchange resin with hydrochloric acid, dilute alkali or the like and glutamic acid values then are crystallized from the eluate. While these multiple contact processes are more intricate, they provide a purer final glutamic acid solution. Such processes are described, inter alia, in U.S. Patent 2,921,002 and British Patent 811,688.

While known processes provide glutamic acid in a purified form, the art has continued its quest for even more efficient means of separating glutamic acid values from glutamic acid-containing solutions.

It is the primary object of this invention to provide an efficient method for the recovery of glutamic acid values from glutamic acid-containing solutions.

It is a further object of this invention to provide an efficient method for the recovery of glutamic acid values from glutamic acid-containing solutions employing ion exchange resins.

It is a still further object of this invention to provide an efficient method for the recovery of glutamic acid values from fermentation broths employing ion exchange resins.

In accordance with this invention there is provided a method for recovering glutamic acid values from a glutamic acid-containing solution which comprises:

(1) Contacting a substantially solids-free glutamic acid-containing solution with an adsorbent to remove non-ionic materials and provide a first purified solution; and (2) Contacting said first purified solution with a cation-exchange resin in the alkali metal form and a strong anion-exchange resin having exchangeable ions selected from the group consisting of glutamate and hydroxyl ions to provide a second purified solution containing alkali metal glutamate; and (3) Recovering a substantial amount of alkali metal glutamate from said second purified solution.

The method of this invention provides a final glutamic acid-containing solution that contains only a minimum of impurities. This solution is obtained without the necessity of eluting glutamic acid from the resins. By following the practice of this invention, the ion exchange resins remove the impurities and at the same time convert the glutamic acid values into the desirable alkali metal glutamate form.

As employed in this specification the term "solids-free" refers to solutions free of undissolved solids. The term "alkali metal glutamate" refers to monoalkali metal glutamate. Further, the term "glutamic acid-containing solution" refers to solutions containing glutamic acid or its salts.

The method of the present invention is applicable generically to glutamic acid-containing solutions and is particularly applicable to glutamic acid-containing fermentation solutions or broths. The presence of a variety of inorganic salts in fermentation broths and the use of ammonia and the like to maintain the desired pH during the fermentation, results in the glutamic acid values being present in the final broth as ammonium glutamate as well as other inorganic glutamate salts.

For most efficient operation the glutamic acid-containing fermentation solutions should be free of excessive amounts of suspended solids. Accordingly, the fermentation broths are generally centrifuged or the like to remove cells. The solutions then desirably are filtered to remove colloidal solids. Filtration of glutamic acid solutions is well known in the art and may be accomplished employing standard plate and frame or rotary filters. If desired, filter aids may also be employed to increase the efficiency of the filtration. The substantially solids-free glutamic acid-containing solutions suitable for the practice of this invention generally will be characterized by pH of from about 5 to about 9.

The substantially solids-free glutamic acid-containing fermentation solutions are first contacted by a non-ionic solid absorbent to remove non-ionic materials and color bodies. The solid absorbents which may be employed for the practice of the invention are well known to the art and include, inter alia, granular carbon, clay, absorbent resins and the like. Because of its efficiency, granular carbon is preferred for the practice of this invention.

Granular carbon absorbents are readily available from a variety of commercial sources. Similarly, clays suitable for this invention are also available commercially. The adsorbent resins contemplated for use in the practice of this invention are porous and present a large active surface which exhibits adbsorptive capabilities for complex organic bodies. The resins may contain, for example, a phenolic matrix with mixed polar groups. Such resins may exhibit minor ion exchange characteristics but they function primarily as adsorbents. Adsorbent resins are generally available in granular form and may include, inter alia, amine-aldehyde condensation products.

The first purified solution resulting from the adsorption of non-ionic impurities is then subjected to contact with a cation exchange resin in the alkali metal form. The cation exchange resin will release alkali metal ions to the solution and at the same time adsorb undesirable cations from the solution such as ammonium cationic color bodies and the like. The alkali metal ions in the solution are available to form alkali metal glutamates as well as to form alkali metal salts with anionic impurities. Since gultamic acid is furnished commercially as either monosodium glutamate or monopotassium glutamate, the sodium and potassium forms of the cation exchange resin most desirably are employed for the practice of this invention.

The cation exchange resins employed for the practice of this invention are also well known to the art. Typical strong cation exchange resins contain, for example, sulfonic acid or methylene sulfonic acid groups. Typical weak cation exchange resins contain, for example, carboxylic acid groups or phenolic hydroxyl groups. Such resins are described, inter alia, in U.S. Patents 2,366,007 and 2,687,383. Both strong and weak cation exchange resins are operable in the process of this invention, although strong cation exchange resins are preferred.

The glutamic acid-containing solution then is contacted by a strong anion exchange resin in the glutamate form or in the hydroxy form. When the solution is contacted with resins in the glutamate form, glutamate ions from the resin will combine with the alkali metal ions in the solution to form an alkali metal glutamate. The anion exchange resin, in turn, will adsorb anionic impurities such as chlorides, sulfates, phosphates, carbonates, anionic color bodies, and the like.

When the solution is contacted with resins in the hydroxyl form, hydroxyl ions from the resin will combine with excess alkali metal ions in the solution to provide a purified alkali metal glutamate solution that also contains alkali metal hydroxide. The alkali metal hydroxide readily can be converted to additional alkali metal glutamate by the addition of glutamic acid. The solution is not contaminated by the neutralization since only glutamate salt and water are formed.

Typical strong anion exchange resins employed in the practice of this invention include those resins containing, for example, quaternary ammonium groups. Such resins are well known to the art and are described, inter alia, in U.S. Patents 2,614,099; 2,700,672; and 2,753,279.

While the process has been described as including a first contact with a cation exchange resin followed by later contact with a strong anion exchange resin, these steps may be reversed and the glutamic acid-containing solution first may be contacted with a strong anion exchange resin and subsequently contacted with a cation exchange resin. In either case the result is the same, viz, the final solution contains an alkali metal glutamate.

After the glutamic acid-containing solution has been contacted with the ion exchange resins, the alkali metal glutamate is recovered from the solution. The recovery can be accomplished employing any of the methods known to the art. In a preferred embodiment of the invention, the alkali metal glutamate solution is filtered and concentrated to precipitate a crop of monoalkali metal glutamate crystals. The concentration can be accomplished simply by boiling the liquid at atmospheric pressure or at a temperature of slightly over 100° C. The concentration, however, desirably is accomplished by boiling under vacuum. Use of a vacuum readily can lower the boiling temperature to within the range of from about 45 to about 75° C. The glutamate solutions provided by this invention are sufficiently pure to permit the precipitation of significant amounts of the alkali metal glutamate present.

After precipitation of a crop of monoalkali metal glutamate crystals, the mother liquor may be acidified with a mineral acid such as hydrochloric acid, sulfuric acid or the like to a pH of from about 3 to about 3.4 to percipitate the remaining glutamate values as glutamic acid.

It will be apparent that the method of this invention can be practiced either as a batch or as a continuous process. Further, temperatures and pressures are not critical factors in this invention and the invention readily may be practiced at ambient temperatures and pressures.

Since continuous processes generally are better suited for commercial purposes, the figure is a schematic drawing of a continuous type process suitable for the practice of this invention.

A fermentation broth 1 is centrifuged in centrifuge 2 to remove cells. The substantially cell-free broth is transmitted through line 3 to filter 4 where colloidal impurities are removed. The substantially solids-free glutamic acid-containing solution then is transferred through line 5 to adsorptive tower 6 where it is passed through an adsorbent such as charcoal or the like to remove non-ionic impurities including color bodies. The solution then is conducted through line 7 to cation exchange column 8. Column 8 contains a cation exchange resin in the alkali metal form. This resin exchanges the alkali metal ions for other cations in the solution such as ammonium, calcium or the like. The solution then is passed through line 9 to anion exchange column 10. This column contains an anion exchange resin in the glutamate form and consequently the resin will exchange glutamate ions for anions such as chlorine, sulfate, phosphate and the like. The glutamic acid-containing solution, having only a minimum content of impurities, then is passed through a polish filter 11 and line 12 to concentrator 13. In concentrator 13 the solution is evaporated to provide a crystal crop of monoalkali metal glutamate which is removed through line 14. The mother liquor is drawn off through line 15 and may be further processed for the recovery of remaining glutamate values. Such further processing, for example, can include the adjustment of the pH to about 3.2 with a mineral acid such as hydrochloric acid to provide a crop of glutamic acid crystals.

While the schematic representation in FIGURE 1 includes only one column for the adsorption and for each of the ion exchangers, in commercial practice it is desirable to include two or more of each of said columns in series with appropriate provisions for bypass. In this manner the various resins can be re-generated without interrupting the process. Regeneration of the adsorption and ion exchange columns is within the skill of the routineer and will not be described in detail.

The following examples are included in order more fully to demonstrate the practice of this invention. These examples are included for illustrative purposes only and in no way are intended to limit the scope of the invention.

*Example 1*

A fermentation broth was filtered to provide about 8.5 liters of filtrate containing 90 mg./ml. of glutamic acid and 230 mg./ml. of total solids (G.A. purity of 39%). The filtered broth was passed through 1800 ml. of granular activated carbon and the carbon was then rinsed with water to provide 9.6 liters of effluent in which the color level was about 2% of the feed concentration. Virtually all of the glutamic acid was accounted for in the effluent.

The carbon effluent was then passed through 3500 ml. of a sulfonic acid cationic exchange resin in the sodium form (Amberlite IR 120—Rohm & Haas. A water rinse provided 10.5 liters of effluent. At least 98% of the glutamic acid present in the feed was accounted for in the effluent.

The cation exchange effluent then was passed through 4,200 ml. of a quaternary ammonium anion exchange resin (Amberlite IRA 410) in the glutamate form. A water wash provided 12.8 liters of effluent essentially free of sulfate ions, chloride ions and color bodies. About 89% of the glutamic acid present in the original feed was accounted for in the final effluent.

Following the treatment, the final effluent was subjected to boiling under vacuum at 55° C. to provide monosodium glutamate crystals.

*Example 2*

A fermentation broth containing 75.3 mg./ml. of glutamic acid and 200 mg./ml. of solids (G.A. purity—37.7%) was contacted with granular carbon, a sulfonic acid cation exchange resin in the sodium form (Amberlite IR 120), and a quaternary ammonium anion exchange resin in the glutamate form (Amberlite IRA 410) to provide a purified monosodium glutamate concentrate having purity of about 77%.

The concentrate was pan boiled at 55° C. and was filtered to provide a first monosodium glutamate cake. Boiling was then continued and a second monosodium glutamate cake was obtained by filtration. Finally the mother liquor was adjusted to a pH of about 3.2 with hydrochloric acid to provide a final glutamic acid crystal product. The results of this process are reflected in Table 1 below.

TABLE 1

|  | Polarimeter Purity | Cl- as percent NaCl | CaO vers., percent | Color, percent $T_B$ 33% MSG Soln. | Recovery, percent |
|---|---|---|---|---|---|
| 1st MSG Cake | 98.6 | 0.10 | 0.13 | 94 | 55 |
| 2nd MSG Cake | 98.5 | 0.11 |  | 90 | 42 |
| GA Cake | 97.4 | 0.02 | 0.01 | 70 |  |

*Example 3*

The process of Example 2 was repeated employing a fermentation broth containing 63.7 mg./ml. of glutamic acid and 182 mg./ml. of solids (G.A. purity—35%). The final concentrate was characterized by a MSGE purity of 77.3%. Crystallization according to the method of Example 2 provided the following results:

TABLE 2

|  | Polarimeter Purity | Cl- as percent NaCl | CaO vers., percent | Color, percent $T_B$ 33% MSG Soln. | Recovery, percent |
|---|---|---|---|---|---|
| 1st MSG Cake | 98.8 | 0.04 | 0.06 | 97 | 59 |
| 2nd MSG Cake | 98.1 | 0.08 | 0.07 | 96 | 61 |
| GA Cake | 97.2 | 0.01 | 0.00 | 79 |  |

Since modifications of the invention will be apparent to those skilled in the art, it is intended that this invention be limited only by the scope of the appended claims.

I claim:

1. A method for recovering glutamic acid values from a glutamic acid-containing fermentation solution which comprises:
   (1) contacting a substantially solids-free glutamic acid-containing fermentation solution having a pH from about 5 to about 9 with an adsorbent selected from the group consisting of carbon, clay and adsorbent resins to remove non-ionic materials and provide a first purified solution;
   (2) contacting said first purified solution with a cation-exchange resin in an alkali metal form selected from the group consisting of sodium and potassium and a strong anion exchange resin having exchangeable ions selected from the group consisting of glutamate and hydroxyl ions to provide a second purified solution containing alkali metal glutamate; and
   (3) precipitating a substantial amount of alkali metal glutamate from said second purified solution.

2. The method of claim 1 wherein the anion exchange resin is in the glutamate form.

3. The method of claim 1 wherein the anion exchange resin is in the hydroxyl form.

4. A method for recovering glutamic acid values from a glutamic acid-containing fermentation solution which comprises:
   (1) filtering the fermentation solution having a pH from about 5 to about 9 to remove suspended solids;
   (2) contacting said filtered solution with adsorbent charcoal to remove non-ionic materials and provide a first purified solution; and
   (3) contacting said first purified solution with a cation exchange resin in an alkali metal form selected from the group consisting of sodium and potassium and a strong anion exchange resin in the glutamate form to provide a second purified solution containing alkali metal glutamate; and
   (4) concentrating said second purified solution to provide a crop of alkali metal glutamate crystals.

5. A method for recovering glutamic acid values from a glutamic acid-containing fermentation solution which comprises:
   (1) contacting a substantially solids-free fermentation solution having a pH from about 5 to about 9 with adsorbent charcoal to remove non-ionic materials and provide a first purified solution;
   (2) contacting said first purified solution with a cation exchange resin in the alkali metal form selected from the group consisting of sodium and potassium and a strong anion exchange resin in the hydroxyl form to provide a second purified solution containing sodium glutamate; and
   (3) adding glutamic acid to said second purified solution to combine with excess alkali metal hydroxide and form alkali metal glutamate; and
   (4) precipitating a substantial amount of alkali metal glutamate from said solution.

6. The method of claim 1 wherein said fermentation solution contains glutamic acid values in the form of ammonium glutamate, the contacting of said first purified solution with said cation exchange resin is effective to release sodium or potassium ions from said cation exchange resin to the solution and absorb ammonium cations present in said first purified solution, and the contacting of said first purified solution with said anion exchange resin is effective to release said glutamate or hydroxyl ions to the solution and absorb anionic impurities present in said first purified solution, whereby glutamate ions in said fermentation solution remain in solution throughout the contacting steps.

References Cited

UNITED STATES PATENTS

| 2,937,199 | 5/1960 | Donahue | 260—527 |
| 3,080,297 | 3/1963 | Phillips et al. | 195—47 |
| 3,245,804 | 4/1966 | Heegaard et al. | 260—527 |

FOREIGN PATENTS

| 1,088,975 | 9/1960 | Germany. |

RICHARD K. JACKSON, *Primary Examiner.*

LEON ZITVER, *Examiner.*

I. R. PELLMAN, A. P. HALLUIN, *Assistant Examiners.*